(12) United States Patent
Stottmeister

(10) Patent No.: US 8,348,058 B2
(45) Date of Patent: Jan. 8, 2013

(54) HOOD OR COVER, IN PARTICULAR FOR CONTAINERS FOR A CORROSION-SENSITIVE LOAD

(75) Inventor: Gerhard Stottmeister, Affalterbach (DE)

(73) Assignee: Corpac Deutschland GmbH & Co. KG, Oberstenfeld (DE)

( * ) Notice: Subject to any disclaimer, the term of this patent is extended or adjusted under 35 U.S.C. 154(b) by 901 days.

(21) Appl. No.: 12/221,188

(22) Filed: Jul. 30, 2008

(65) Prior Publication Data

US 2009/0020529 A1 Jan. 22, 2009

Related U.S. Application Data

(63) Continuation of application No. PCT/EP2007/050838, filed on Jan. 29, 2007.

(30) Foreign Application Priority Data

Jan. 31, 2006 (DE) .......................... 10 2006 005 666
Mar. 20, 2006 (DE) .......................... 10 2006 014 551

(51) Int. Cl.
B65D 85/00 (2006.01)

(52) U.S. Cl. .................. 206/459.1; 206/207; 206/213.1; 206/204

(58) Field of Classification Search .................. 220/212; 206/204, 459.1, 459.5, 213.1, 207, 701
See application file for complete search history.

(56) References Cited

U.S. PATENT DOCUMENTS

| | | | |
|---|---|---|---|
| 4,930,557 A * | 6/1990 | Lohse | 150/166 |
| 5,281,471 A | 1/1994 | Diete et al. | |
| 5,813,564 A | 9/1998 | Luo | |
| 5,908,135 A * | 6/1999 | Bradford et al. | 220/673 |
| 6,481,631 B1 | 11/2002 | Poustis | |
| 6,540,959 B1 | 4/2003 | Reinhard et al. | |
| 6,752,934 B2 * | 6/2004 | Reinhard et al. | 252/389.61 |
| 2004/0070504 A1 | 4/2004 | Brollier et al. | |
| 2005/0019537 A1* | 1/2005 | Nakaishi et al. | 428/218 |
| 2005/0219054 A1* | 10/2005 | Nowak | 340/572.8 |
| 2007/0217717 A1* | 9/2007 | Murray | 383/38 |
| 2007/0231532 A1* | 10/2007 | Walters et al. | 428/97 |

FOREIGN PATENT DOCUMENTS

| | | |
|---|---|---|
| DE | 39 17 110 | 11/1990 |
| DE | 40 40 586 | 6/1992 |
| DE | 196 33 478 | 2/1998 |
| DE | 199 60 663 | 8/2000 |
| DE | 203 09 544 | 8/2003 |
| EP | 0 639 657 | 2/1995 |

(Continued)

OTHER PUBLICATIONS

*Patent Abstracts of Japan*, Abstract of Japanese Patent "CAP type RF-ID and RF-ID System Using the Same", Publication No. 2006062716, Mar. 9, 2006, Japanese Application No. 2004248260, filed Aug. 27, 2004.

*Primary Examiner* — David Fidei
*Assistant Examiner* — Raven Collins
(74) *Attorney, Agent, or Firm* — Lipsitz & McAllister, LLC

(57) ABSTRACT

In order to improve a hood or cover, in particular for closing storage or transporting containers for accommodation corrosion-sensitive load or freight, such that it allows quick and easy identification of the freight located in the container, it is proposed that the hood or the cover comprises an electronic memory element.

55 Claims, 14 Drawing Sheets

FOREIGN PATENT DOCUMENTS

| | | |
|---|---|---|
| EP | 0 976 851 | 2/2000 |
| EP | 0 994 041 | 4/2000 |
| EP | 1 284 320 | 2/2003 |
| EP | 1 281 790 | 8/2004 |
| FR | 2 772 529 | 6/1999 |
| WO | 00/46122 | 8/2000 |

* cited by examiner

US 8,348,058 B2

HOOD OR COVER, IN PARTICULAR FOR CONTAINERS FOR A CORROSION-SENSITIVE LOAD

CROSS REFERENCE TO RELATED APPLICATIONS

This application is a continuation under 35 U.S.C. §365 of international patent application PCT/EP2007/050838 of Jan. 29, 2007 which claims priority to German patent applications 10 2006 005 666.3 of Jan. 31, 2006 and 10 2006 014 551.8 of Mar. 20, 2006. The contents of these applications are incorporated by reference herein in their entirety and for all purposes.

FIELD OF THE INVENTION

The invention relates to a hood or a cover, in particular for closing storage or transport containers for receiving a corrosion-sensitive load.

In addition, the invention relates to a storage or transport container, in particular for receiving a corrosion-sensitive load.

BACKGROUND OF THE INVENTION

Containers for the storage and/or transport of a corrosion-sensitive load are known for different fields of operation. Such containers are used in large numbers within the industrial manufacturing sector, e.g. in the automotive industry, to allow an efficient stock holding facility for a plurality of different parts that can be automated. Such containers, also referred to as small load carriers (SFCs), are generally in the shape of a cuboid open at the top. Hoods made of flexible sheeting as well as rigid covers are suitable for closing such containers.

When the load in the containers comprises metal products, volatile corrosion inhibitors (VCI) are used to protect these from atmospheric corrosion during storage or transport. VCI are chemical substances, which sublimate at room temperature and are deposited on the surface of the products to be protected in order to develop their corrosion-inhibiting action there.

Particularly in the case of extensive stock holding facilities with a large number of different products and/or individual parts, there is often a problem of identifying the contents of different containers clearly at any time. Opening the containers to determine their contents and the provision of written labelling are both complicated measures that can each only be performed manually. Moreover, the repeated opening of stored containers causes a portion of the volatile corrosion inhibitor to escape from the container and/or ambient air to penetrate into the container, so that the corrosion protection is impaired.

It is an object of the present invention to provide a hood or a cover, by means of which a quick and simple identification of the load located in the container is possible.

SUMMARY OF THE INVENTION

In a first aspect of the invention, a hood or cover, in particular for closing storage or transport containers for receiving a corrosion-sensitive load, is equipped with an electronic memory element.

In a second aspect of the invention, a storage or transport container, in particular for receiving a corrosion-sensitive load, is equipped with an electronic memory element.

In a third aspect of the invention, a storage or transport container, in particular for receiving a corrosion-sensitive load, has an interior, an opening and a cover for closing the opening. The cover comprises an electronic memory element. The cover has an outside and an inside, of which the latter is oriented towards the interior on closure of the opening of the container. The cover comprises a receiving space for at least one volatile corrosion inhibitor. Moreover, it is provided with a fluid connection between the receiving space in the inside of the cover.

In a fourth aspect of the invention, a storage or a transport container in particular for receiving a corrosion-sensitive load having an interior, an opening and a cover. The cover comprises an electronic memory element. Moreover, the cover comprises on its inside a holding device for a carrier element, which contains at least one volatile corrosion inhibitor.

BRIEF DESCRIPTION OF THE DRAWING FIGURES

The foregoing summary and the following description may be better understood in conjunction with the drawing figures of which:

DETAILED DESCRIPTION OF PREFERRED EMBODIMENTS OF THE INVENTION

Figure 1:
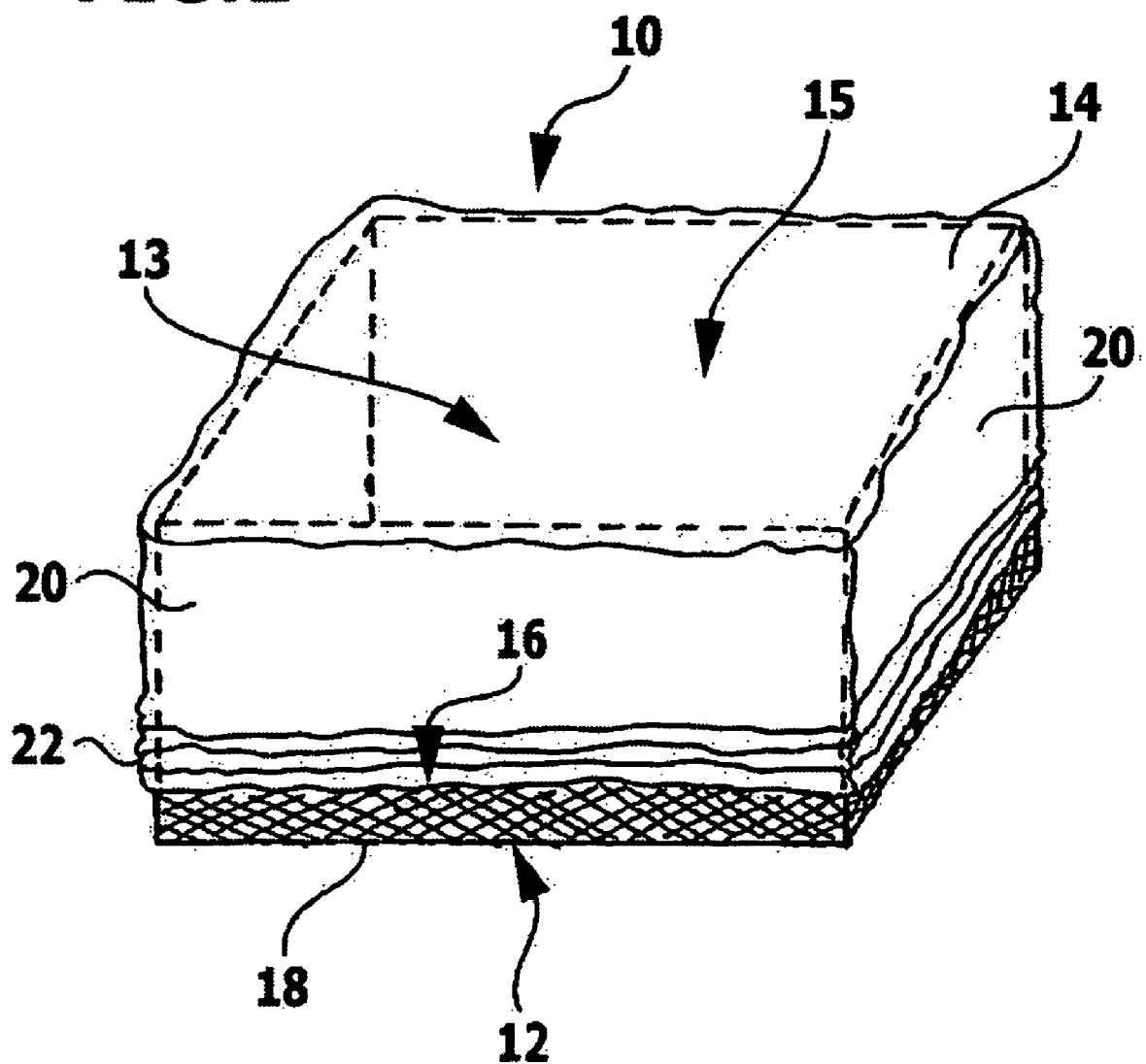
FIG. 1 is a perspective drawing of a first exemplary embodiment of a hood according to the invention and a container closed thereby.

Although the invention is illustrated and described herein with reference to specific embodiments, the invention is not intended to be limited to the details shown. Rather, various modifications may be made in the detailed within the scope and rage of equivalence of the claims and without departing from the invention.

The present invention relates to a hood or cover, in particular for closing storage or transport container for receiving a corrosion-sensitive load, the hood and/or the cover comprises an electronic memory element.

This object is achieved according to the invention with a hood and a cover of the aforementioned type in that the hood or the cover comprises an electronic memory element.

Particular configurations and advantages of the hood according to the invention and also of the cover according to the invention that result with respect to the use of a volatile corrosion inhibitor will be explained in detail below. The advantages of the electronic memory element will firstly be outlined below.

The provision of such a memory element in or on the hoods or covers used to close storage or transport containers allows a very simple, secure and comprehensive identification of the load. Moreover, hoods with an electronic memory element can also be used for packing piece goods, e.g. motors or transmissions. The memory element enables the contents to be identified at any time without the packaging being opened and the corrosion protection being impaired as a result. For example, stocktaking or customs clearance of the goods is substantially simplified as a result.

The memory element can be used to store any type of relevant data, in particular the type and quantity of the contents of the containers, precise type designations, the storage date or the destination in the case of transport. In this case the memory element can also serve to track the transport route of the goods.

There is the additional possibility of storing the working life and/or the deployment date of a volatile corrosion inhibitor in the element. This is of interest because a depletion of the corrosion inhibitor occurs as a result of its continuous outward diffusion, and therefore this must be replaced after a specific time in order to assure a constant corrosion protection. The remaining working life of the corrosion inhibitor or the time when it should be replaced can be determined in each case from the stored data.

Of particular relevance is the problem of renewal of the corrosion protection in the case of very long storage periods, which can amount to up to 15 years, for example. This is particularly the case in the automotive industry, since spare parts for older vehicle models must be held over many years in some cases because of legal provisions. It is particularly important here that the stored parts can be clearly identified at any time and that a reliable corrosion protection is maintained over the entire storage period. The provision of an electronic memory element according to the present invention offers a simple and comprehensive solution for both problems here.

An electronic memory element allows a large quantity of data to be stored in a very small space, compared to a written label for instance. Moreover, an electronic memory chip can be read and/or recorded by machine, so that these actions can also be conducted in an automated manner.

The memory element is preferably readable without contact. This is especially the case with the assistance of so-called RFID chips (radio frequency identification), which can be read by wireless transmission.

It is additionally preferred if the memory element is also recordable without contact, so that the data stored in the element can be updated in a simple manner as required. This applies in particular to the working life of the corrosion protection discussed above, which is impaired by repeated opening of the container, and which can then be updated accordingly on each opening.

The memory element is preferably non-detachably connected to the hood or the cover. A loss of data as a result of the memory element being removed or falling off can be avoided.

The memory element is advantageously welded onto the hood or the cover. Detachment of the memory element is thus practically excluded. In the case of the hood according to the invention, the memory element can also be welded in particular in a weld of the hood.

In addition, the memory element can also be adhered to the hood or the cover. Adhesion can be favourable in particular if welding is not possible because of the materials of the memory element and the hood or cover.

The electronic memory element preferably comprises an electronic memory chip and a carrier, on which the memory chip is arranged. In this case, the memory chip and/or also an RFID chip can be embedded in the carrier or adhered to this.

In turn, the carrier is itself preferably adhered or welded to the hood or cover. In the case of a polyethylene-based hood or cover, such a carrier is also preferably produced on the basis of polyethylene.

In the framework of the present invention it can also be provided that the electronic memory element is arranged on the container itself. Therefore, the invention also relates to a storage or transport container of the aforementioned type, which comprises an electronic memory element. In this case, the arrangement of the memory element on the container can be achieved in the same manner and in accordance with the same embodiments as described in association with the hood according to the invention and the cover according to the invention.

The deployment of a volatile corrosion inhibitor in the container can be achieved in different ways. Thus, in the framework of the invention it can be provided that at least one volatile corrosion inhibitor is fed into the container together with the load in loose form (e.g. as a powder) or combined with a carrier element. However, this has the disadvantage that a replacement of the corrosion inhibitor when it is depleted is very complicated and can only be performed manually.

Besides the use of volatile corrosion inhibitors in loose form or in carrier materials, it is also known to integrate the VCI into plastic sheets (see e.g. EP 1 281 790 B1). Such sheets, which continuously release the corrosion inhibitor by diffusion, can be used in a variety of ways for packaging purposes.

A particular embodiment of the present invention relates to a hood of the aforementioned type, which is produced from a sheet, which contains at least one volatile corrosion inhibitor.

The hood according to the invention, which defines an internal space and an opening, is placed in inverted position with its opening over the storage and transport container. The container is thus closed and at the same time the corrosion inhibitor contained in the sheet is released to the interior of the container. A corrosion protection of the load contained in the container is also assured over a longer storage period as a result.

The hood is replaced when the corrosion inhibitor contained in the sheet is depleted. As a result of storing the deployment date of the hood in the electronic memory element, the remaining working life of the corrosion inhibitor can be determined at any time, as described above.

In order to assure a secure fit of the hood and an adequate degree of impermeability, it was necessary with the hoods known hitherto to insert an additional closing element, e.g. an elastic band, along the opening of the hood. This results in an increased expenditure during production of the hoods, since the insertion can only be done manually, which is associated with significant increases in cost in view of the high piece numbers required.

This problem is solved by a further embodiment of the hood according to the invention, in which the hood is produced from a sheet containing corrosion inhibitor(s) that is elastically extensible. Within the framework of the present invention, a sheet is designated as elastically extensible if the sheet is restored at least substantially to the original dimension after its extension.

Hoods produced from an elastically extensible sheet have significant advantages over the hoods containing VCI used hitherto, irrespective of whether they comprise an electronic memory element or not. In particular, storage or transport containers can be tightly closed with such an elastic hood without the provision of an additional closing element. The elastic hood according to the invention is preferably composed only of the sheet and can therefore be produced by machine in a simple manner. This results in a significant cost-saving compared to the hoods known hitherto.

When closing containers or when packing piece loads for the purpose of storage or transport, the elastic hood according to the invention is generally stretched so that it closely abuts against the packed object as a result of the high elastic restoring force. This reduces the risk of the sheet protruding from the object and being damaged during transport, while also ensuring a high impermeability of the packaging. Particularly from the viewpoint of corrosion protection, it is desirable that the packaging is as airtight as possible, which is enabled to a high degree by the use of an elastic hood according to the invention. In this case, the extension of the sheet along the opening of the hood generally amounts to up to 10% (so-called extension of use).

The impermeability of the hood with respect to air and water vapour can be additionally increased by a bulge being formed along the opening of the hood by bunching of the sheet, said bulge exerting a correspondingly higher pressure on the container.

The extensibility of the sheet, from which the hood according to the invention is produced, can be characterised, amongst other things, by its extension at tear, i.e. by its maximum elongation until it tears. The extension at tear of the sheet preferably amounts to 300% or more, even more preferred 600% or more.

Of importance besides this total extensibility of the sheet until it tears is above all the range of elastic extension, within which the sheet is actually restored to the original dimension. This range is also referred to as reversible extension and preferably amounts to 50% or more, and further preferred to 100% or more.

In addition, the sheet is distinguished in that its elasticity or restoring ability in the elastically extended state is retained over a long period of time, typically at least 8 to 10 weeks.

Depending on the field of use of the elastic hood according to the invention, the thickness of the sheet preferably lies in the range of 40 to 150 μm, in particular in the range of 50 to 80 μm.

The particular properties of the elastically extensible sheet additionally provide the advantage that the hood produced therefrom has a high impact penetration strength perpendicular to the material plane. The elastic hood according to the invention thus provides a good protection against external mechanical influences on the packed object.

The elastically extensible sheet is preferably a plastic sheet produced on the basis of a synthetic polymer. In this case, various polymers, with which the above-described mechanical properties can be achieved, are conceivable as starting material. The sheet is preferably produced on the basis of polyethylene or polyethylene copolymers. These polymers are highly suitable for the production of sheets, in particular by means of the extrusion process.

Particularly suitable starting materials for the sheet are linear low-density polyethylene (LLDPE), very low density polyethylene (VLDPE) or corresponding copolymers. Because of their molecular structure these polymers result in sheets with a high elastic extensibility. In addition, the polyethylenes used can be metallocene polyethylene (mPE) or corresponding copolymers.

In a preferred embodiment of the invention, the sheet comprises two or more layers. In this case, the at least one volatile corrosion inhibitor is preferably contained in the layer of the sheet facing the internal space of the hood, so that the corrosion inhibitor is released exclusively or predominantly in the direction of the container contents or the packed piece load and not to the surrounding area.

The use of multilayered sheets is also particularly advantageous, since the elastic extensibility according to the invention as well as the high tear resistance of the sheet can be further improved by one or more additional layers that contain no corrosion inhibitor. These properties result primarily from the molecular structure of the sheet, which is influenced by the addition of the corrosion inhibitor in the corresponding layer. Layers without corrosion inhibitor in particular also contribute to a high air-tightness and water vapour tightness of the sheet.

The layers of a two- or multilayered, elastically extensible sheet are preferably coextruded. The coextrusion of multilayered sheets can be conducted by means of different extrusion processes, in particular by means of blown sheet extrusion.

It has been found that the advantages of the present invention can be achieved particularly favourably with a hood comprising a three-layered, coextruded sheet, wherein the at least one volatile corrosion inhibitor is contained in one of the outer layers of the sheet.

The at least one volatile corrosion inhibitor is preferably contained in the sheet in the form of a fine powder. This can be achieved in particular by adding the at least one volatile corrosion inhibitor to the polymer melt in a polymer-combined form (compounded) before extrusion of the sheet. This so-called master batch ensures that the at least one corrosion inhibitor is distributed in the sheet as finely and uniformly as possible.

A multiplicity of chemical compounds would be conceivable as volatile corrosion inhibitors. Advantageously, the at least one volatile corrosion inhibitor is selected from nitrates, nitrites, phosphates, silicates, borates, chromates, molybdates, amines, benzoates, heterocyclic compounds and mixtures thereof. The respective sodium salts of the specified compounds are preferably used.

Although the particular advantages of a hood produced from a sheet, which contains a VCI, in particular an elastically extensible sheet, have been outlined in the preceding section, this is not essential in the framework of the present invention. Rather, the hood according to the invention can also be produced from a sheet that contains no volatile corrosion inhibitor. In this case, a corrosion inhibitor can be fed to the container in loose form or in a carrier element, as already discussed.

The sheeting, from which the hood according to the invention is produced, is advantageously translucently coloured. Such a colouration can serve to identify packed objects without having to do without a transparency of the hood.

The hood according to the invention can be produced from one or more sheets, wherein the sheet(s) is/are folded and/or laid one on top of the other and congruent edges of the sheet(s) are partially welded to one another. In this case, the edges of the sheet(s) that are not welded form the opening, by which the hood can be pulled over the container.

As already mentioned, the seams formed during welding provide a preferred possibility for connecting the electronic memory element to the hood by welding the memory element into a weld of the hood.

In order to prevent an undesirable projection of the hood, it is preferred if its structure is adapted to the shape of the storage or transport container. In principle, various shapes are conceivable for such containers, e.g. a cuboidal shape or a cylindrical shape.

In a large majority of cases, cuboidal containers are used, in particular the aforementioned small load carriers. It is therefore preferred that the hood also has a cuboidal structure. This can be achieved in particular by folding the sheet in towards the internal space on the side of the hood opposite the opening.

In a preferred embodiment, the hood is produced from a tube of sheeting, wherein the sheeting for producing the hood is folded towards the interior of the tube along two opposing regions along the longitudinal axis of the tube, and wherein the tube of sheeting is welded at one end so that the folded-in regions of the sheeting are welded to the non-folded regions of the sheeting in four layers. Hoods of this type are particularly simple to produce by folding a continuous tube of sheeting generated means of blown sheet extrusion, as described above, and then cutting it at predetermined intervals and welding along the cutting line. In this case, all work steps can be performed continuously and in an automated manner.

The hood produced in this way can be formed into a cuboidal shape, wherein the previously folded-in regions of the sheeting form two opposite sides of the hood. The weld then runs along a centre line of the side of the hood opposite the opening, wherein the sections of the previously folded region adjacent to the weld are folded in towards the internal space of the hood so that two triangular regions are formed, in which the sheeting comes to lie in three layers one on top of the other.

Alternatively to using a tube, a similar hood can also be produced from two rectangular sheets of equal size, which are welded to one another respectively along three of their edges to form a central weld and two lateral welds adjoining this; wherein the hood has two central folding lines, which respectively run at an identical distance from both sides parallel to the central weld, has two lateral folding lines, which respectively runs at the same identical distance from both sides parallel to the lateral welds, and four diagonal folding lines, which run from the four intersection points of the central folding line with the lateral folding lines as far as the respectively adjacent end of the central weld; wherein the sheet is folded 180° along the diagonal folding lines and along those sections of the lateral folding lines that lie between the intersection points with the central folding lines, so that two triangular sheet regions respectively come to lie congruently one on top of the other; and wherein the sheet is folded 90° along the central folding lines and along those sections of the lateral folding lines that lie outside the intersection points with the central folding lines, so that the hood has a cuboidal shape.

The present invention also relates to the use of a hood, as described above, for closing storage or transport containers.

Further possible uses of the hood according to the invention, in particular a use for packing piece loads and also as an inlet in storage or transport containers, are also the subject of the present invention. In the last-mentioned case, the hood is inserted into a container with the opening upwards in order to pack small load items or piece loads therein in a corrosion-protected manner.

Storage or transport containers for corrosion-sensitive loads, as have been described above, can also be closed with a cover in place of a hood. A cover in the sense of the present invention is understood in particular to be a substantially rigid element, with which the container can be detachably closed.

However, a further problem arises with such containers, namely that a corrosion inhibitor located inside the container can only be replaced in a complicated manner. Therefore, it is also an object of the present invention to facilitate replacing the corrosion inhibitor.

The present invention, therefore, relates also to a cover of the aforementioned type for closing an opening of a container defining an interior, in particular for receiving corrosion-sensitive loads, wherein the cover has an outside and an inside, of which the latter is oriented towards the interior for closing the opening of the container, and wherein (i) the cover comprises a receiving space for at least one volatile corrosion inhibitor, wherein a fluid connection is provided between the receiving space and the inside of the cover, and/or wherein (ii) on its inside the cover comprises a holding device for a carrier element, which contains at least one volatile corrosion inhibitor.

Such a cover provides the advantageous possibility of receiving or holding one or more volatile corrosion inhibitors, which can diffuse into the interior of the container by means of the fluid connection, so that the sublimated gaseous corrosion inhibitor can be distributed in the entire interior and over the entire contents of the container. This applies irrespective of whether a receiving space according to variant (i) or a holding device for a carrier element according to variant (ii) is provided, wherein in particular embodiments of the cover are also conceivable, in which both variants are implemented simultaneously.

The advantages of the configuration of the cover described here can be provided irrespective of whether the cover comprises an electronic memory element or not.

Replacement of the corrosion inhibitor is substantially simplified as a result of the arrangement according to the invention of the at least one corrosion inhibitor on the cover. After removal of the cover from the container, unused corrosion inhibitor can be replenished quickly and simply and/or the carrier element can be replaced by a carrier element with unused corrosion inhibitor. In particular, because of its fixture to the cover the carrier element does not have to be firstly sought in the interior of the container, i.e. among the contents.

The time at which the corrosion inhibitor should be replaced can be simply determined at any time by the data filed in an electronic memory element. When replacing the corrosion inhibitor the data are then updated accordingly, as has been described in detail above.

A renewal of the corrosion protection can also be achieved in a particularly quick and advantageous manner by removing the entire cover from the container and replacing it with a cover of the same type with unused corrosion inhibitor. Such a replacement of the cover can also be automated and performed by machine, e.g. by means of robots, so that the cover according to the invention is also very favourably suited in particular to the use within an extensive stock holding facility.

The cover according to the invention provides the further advantage that it allows a homogeneous distribution of the corrosion inhibitor in the entire interior of the container to a substantially greater extent than if the corrosion inhibitor is fed into the interior together with the load items. The latter can lead to the corrosion inhibitor being covered by a part of the load, which makes a uniform distribution of the corrosion inhibitor more difficult. In contrast to this, in the solution according to the invention the at least one volatile corrosion inhibitor is spaced from the load items, can be distributed unhindered in the interior after sublimation and be deposited evenly on the corrosion-sensitive load items.

The receiving space according to variant (i) of the cover according to the invention allows at least one volatile corrosion inhibitor to be accommodated in any desired form, e.g. in pure form or in mixture with other substances, in the form of a powder, a liquid, a solution etc.

The receiving space is preferably also configured to accommodate a carrier element containing at least one volatile corrosion inhibitor. The use of corrosion inhibitors in or on a carrier element provides the advantage that this is easy to handle. Preferred carrier elements, which are described below, additionally benefit the outward diffusion of the corrosion inhibitor. The receiving space is preferably adapted to the structure of the carrier element and accordingly is configured, for example, to be cuboidal, cylindrical or hemispherical.

The receiving space is preferably defined at least partially by a recess arranged on the cover. Such a recess is easy to produce using manufacturing techniques and additionally provides the advantage that a receiving space can be produced without having to deviate from a preferred substantially planar structure of the cover. As a result, the cover according to the invention can also be advantageously configured to be stackable and stored in a space-saving manner.

In a preferred embodiment of the invention, the fluid connection between the receiving space and the inside of the cover is formed by one or more perforations in a boundary of the receiving space. A corrosion inhibitor located in the receiving space can diffuse into the interior of the container through the perforation or perforations. In order to assure as intensive a gas exchange as possible between the receiving space and the interior of the container, the boundary preferably has a multiplicity of perforations. The perforations can be arranged at regular intervals, in particular the boundary or a part of the boundary can be a grating or a perforated wall, for example.

It is also advantageous if the receiving space has a filling opening, which can be closed with a closure element. Such a filling opening is preferably sufficiently large to enable a carrier element for insertion to be inserted comfortably into the receiving space or to fill this with loose corrosion inhibitor, and thus benefits a simple and quick replacement of the corrosion inhibitor. In this case, the closing element prevents the non-sublimated corrosion inhibitor or the carrier element from falling out of the receiving space.

It is particularly advantageous if the receiving space can be filled through the filling opening from the outside of the cover. In the case of such a configuration, the corrosion inhibitor can be replaced without the cover having to be removed from the container. For example, the closing element can be a detachable, pivotal or displaceable flap or the like. The filling opening of the receiving space is preferably closable to be gastight so that the corrosion inhibitor is substantially prevented from escaping to the outside.

In this embodiment it is also particularly favourable if the time of replacement of the corrosion inhibitor or its working life is filed in an electronic memory element. According to variant (ii) of the cover according to the invention, this comprises a holding device. A receiving space is preferably at least partially defined by the holding device. As a result of this, a carrier element can be fixed on the cover within a defined region, wherein the receiving space can be adapted to the structure of the carrier element to be inserted.

In an advantageous embodiment of the cover according to the invention, the holding device comprises a support element, which is configured and arranged on the cover in such a manner that a carrier element can be inserted between the cover and the support element. Such a support element can hold carrier elements of different types and structures on the cover.

The support element preferably forms a part of the boundary of the receiving space. For example, it can comprise a surface that runs parallel to the cover and spaced from this. In this case, as described above, the receiving space can be partially defined by a recess on the cover. In order to assure the most effective possible diffusion of the at least one volatile corrosion inhibitor into the interior of the container, the support element preferably has one or more perforations, such as described above with reference to the boundary of the receiving space. The support element can be a grating, for example.

In a further preferred embodiment of the invention, the holding device is configured for holding a carrier element by a shape- and/or force-locking connection. In particular, the holding device can comprise one or more clamping elements, wherein the carrier element is held, for example, between the clamping element(s) and the cover or between a plurality of clamping elements.

According to a further advantageous embodiment, the holding device can comprise one or more spikes, barbs or the like. Thus, the carrier element can be placed on the holding element, for example, and/or can be at least partially penetrated by this.

The holding device, in particular according to the above-described embodiments, is preferably moulded on the cover in one piece. Covers with a holding device moulded on in one piece can be produced simply and inexpensively.

It is advantageous if the holding device comprises a first holding element, which can be connected to a second holding element corresponding to the first holding element on the carrier element. For example, the holding device can comprise a part of a touch and close fastener as first holding element, i.e. an element with barbs or an element with loops, for example, wherein the respective other element can be arranged on the carrier element or can form this itself.

Alternatively or additionally to the embodiments described thus far, the holding device can also comprise an adhesive medium, preferably a glue. In particular, an adhesive medium in the form of a glue can be used for fastening a part of a touch and close fastener to the cover or also for direct fastening of the carrier element, e.g. in the form of a double-sided adhesive tape. In this way, conventional covers can also be modified subsequently in the sense of the present invention.

The cover according to the invention is preferably produced from plastic. The production from plastic, in particular by injection moulding, enables a holding device to be moulded in one piece on the cover in a simple manner.

The cover is preferably substantially planar in configuration. It preferably has a substantially rectangular shape, so that it can be used, for example, to close the cuboidal containers frequently used.

The cover according to the invention is preferably configured such that it is stackable with further covers of the same kind. A stacking ability of the covers can be achieved, for example, by configuring the inside and the outside of the cover to correspond to one another, so that the stacked covers lie one on top of the other and/or intermesh in a form-locking arrangement. In particular, the inside and outside of the cover can be substantially planar in configuration, wherein this can be achieved, for example, by defining the receiving space by a recess on the inside of the cover and/or by arranging the holding device in such a recess.

Alternatively or additionally to this, a stacking ability of the covers can also be achieved by other measures, such as by projections on the inside of the cover, for example, which are arranged adjacent to a holding device. When the covers are stacked, these projections then lie on the outside of the cover located underneath, so that the holding device or the carrier element can be held at a distance from the cover located underneath or can be protected from damage.

As already mentioned, the advantage of stackable covers is in particular that a plurality of covers, which are provided with a corrosion inhibitor or with a carrier element, can be stored in a space-saving manner until they are used to replace covers with depleted corrosion inhibitor. In this case, the corrosion inhibitor or the carrier element is preferably enclosed in the stacked covers to be substantially gastight, so that the corrosion inhibitor is substantially prevented from escaping to the outside.

The cover advantageously comprises a carrier element, which contains at least one volatile corrosion inhibitor. In this case, the carrier element can be arranged in a receiving space of the cover and/or on a holding device, as has been described above.

The carrier element preferably comprises a porous material, in particular a foam material. Such materials have a relatively large internal surface, onto which the at least one volatile corrosion inhibitor, preferably in finely dispersed form, can be adsorbed. A uniform diffusion of the corrosion inhibitor out of the carrier element is also benefited by a porous structure.

In addition, the carrier element can also comprise a tablet, a pellet or the like. To generate such carrier elements, one or more volatile corrosion inhibitors can be pressed in pure form or together with auxiliary and/or filler substances. The resulting tablets or pellets allow the corrosion inhibitor to diffuse out continuously.

In a further preferred embodiment of the invention, the carrier element can comprise a sheath permeable to the volatile corrosion inhibitor. This sheath, e.g. a pouch or similar, contains the at least one volatile corrosion inhibitor preferably in finely dispersed form, e.g. as a powder. The sheath preferably comprises a plastic sheet. A suitable plastic, which allows the diffusion of volatile corrosion inhibitors, is polyethylene, for example.

The same chemical compounds are preferably used as volatile corrosion inhibitors as have already been described in association with the hood according to the invention.

The above-described carrier elements can also be applied in cases, in which the volatile corrosion inhibitor, in or on such a carrier element, is fed into the interior of the container.

The present invention also relates to a container of the aforementioned type, which defines an interior and has an opening, with a cover, as described above, for closing the opening.

The container according to the invention provides the advantageous possibility of fixing one or more volatile corrosion inhibitors to the cover, so that these can diffuse into the interior of the container by means of the fluid connection and can be distributed in the entire interior and over the entire contents of the container. Further advantages of the container according to the invention have already been described in association with the cover according to the invention.

The container is preferably trough-like. It is additionally preferred that it has a substantially cuboidal shape. Containers of this type can be used in a wide variety of ways and are also suitable for an extensive stock holding facility, in particular of smaller individual parts (small load carriers).

The container can preferably be closed by the cover to be airtight and water vapour-tight. As a result, both the penetration of moisture into the interior of the container and escape of the at least one volatile corrosion inhibitor to the outside are substantially prevented.

In order to obtain a particularly high impermeability, the container and/or the cover can comprise a sealing element.

A first exemplary embodiment of a hood according to the invention is shown in a perspective drawing in FIG. 1 and is given the reference 10 there. In addition, FIG. 1 shows a storage or transport container 12, which defines a receiving space 13 and has an opening 14, which is closed by the hood 10. The parts of the container 12, which are covered by the hood 10, are shown therein in dotted lines for reasons of clarity. The hood 10 is preferably transparent.

Both the container 12 and the hood 10 have a substantially cuboidal structure. The container 12 can be a small load carrier (SFC), for example, such as that frequently used in industrial storage.

The hood 10 is produced from a sheet, which comprises at least one volatile corrosion inhibitor and is elastically extensible. For example, this sheet can be produced from a linear low-density polyethylene (LLDPE). The sheet has a high elastic extensibility and restoring force.

Typically, the sheet is a three-layered coextruded sheet with an extension at tear in the range of 650 to 750% and an elastic extension in the range of 50 to 100%. In this case, the at least one corrosion inhibitor is only contained in the layer of the sheet facing the internal space 15 of the hood 10. The corrosion inhibitor can consist of the compounds mentioned earlier or mixtures thereof, such as e.g. sodium benzoate, sodium nitrite or triethanolamine phosphate.

The periphery of the hood 10 along its opening 16, in the non-extended state of the sheet, is smaller than the periphery of the container 12 in a plane parallel to its base surface 18. Therefore, the hood 10 firmly abuts against the side walls 20 of the container 12 because of the elastic restoring force. In addition, the height of the hood 10, i.e. its dimension perpendicular to the base surface 18, is selected to be larger than the height of the side walls 20, so that the sheet forms a bulge 22 along the opening 16 of the hood 10 by gathering. This additionally assures an airtight closure of the container 12.

Figure 2:
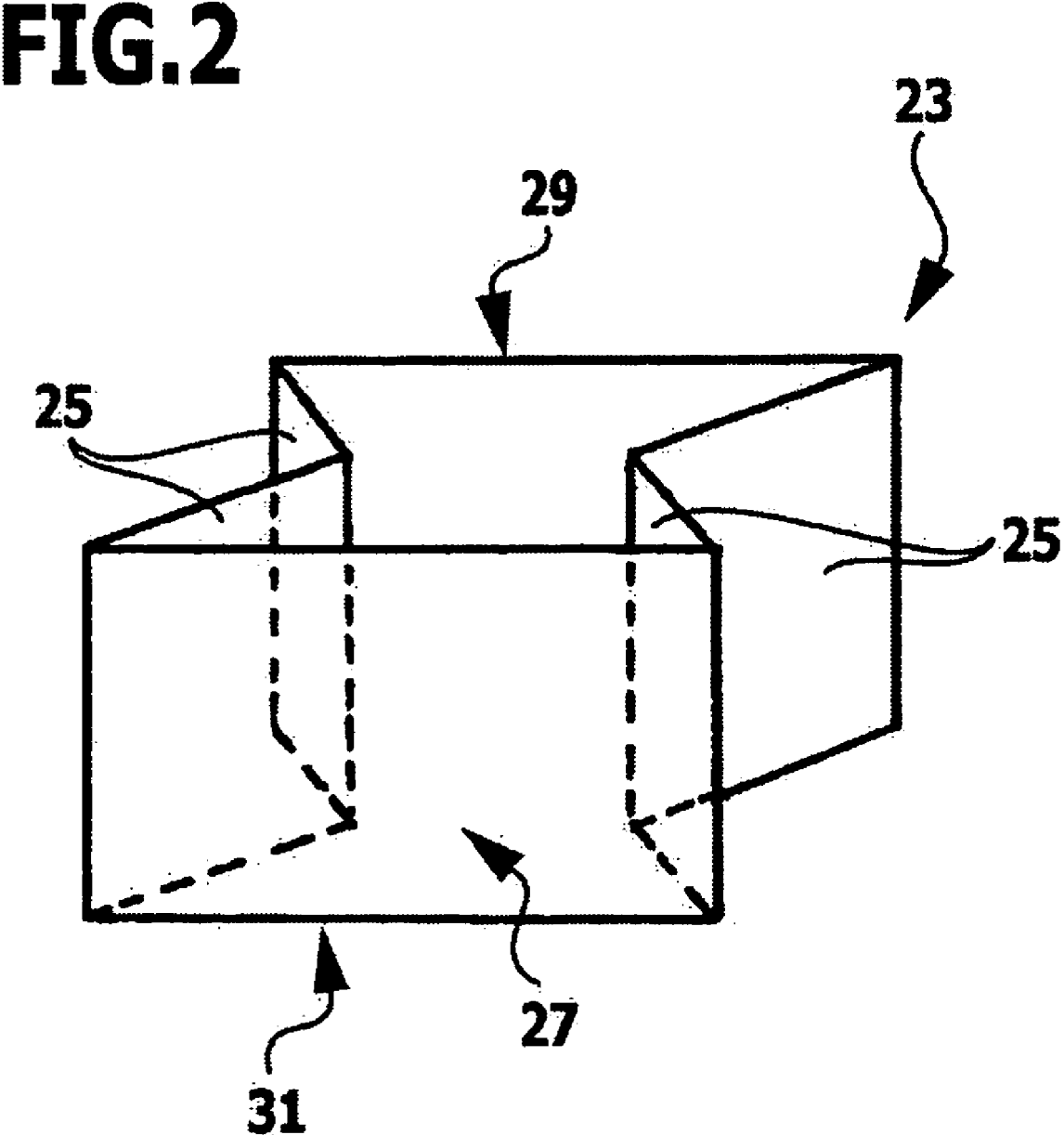
FIG. 2 is a schematic drawing relating to the production of the hood shown in FIG. 1 from a sheet.

The hood 10 can be produced from a tube 23 of sheeting, which is shown schematically in FIG. 2. Such a tube 23 of sheeting can be generated in particular by means of blown sheet extrusion.

In this case, the sheeting is firstly folded in towards the interior 27 of the tube 23 along two opposing regions 25 along the longitudinal axis of the tube 23. The tube 23 of sheeting is then welded at one end 29 so that the folded-in regions 25 of the sheeting are welded to the non-folded regions of the sheeting in four layers (not shown in FIG. 2). The opposite end 31 of the tube 23 that is not welded forms the opening 16 of the hood 10.

The extrusion of a continuous tube of sheeting, the cutting to length of individual tubes 23 of sheeting and also the welding at their ends 29 can be performed continuously and in an automated manner.

Figure 3:
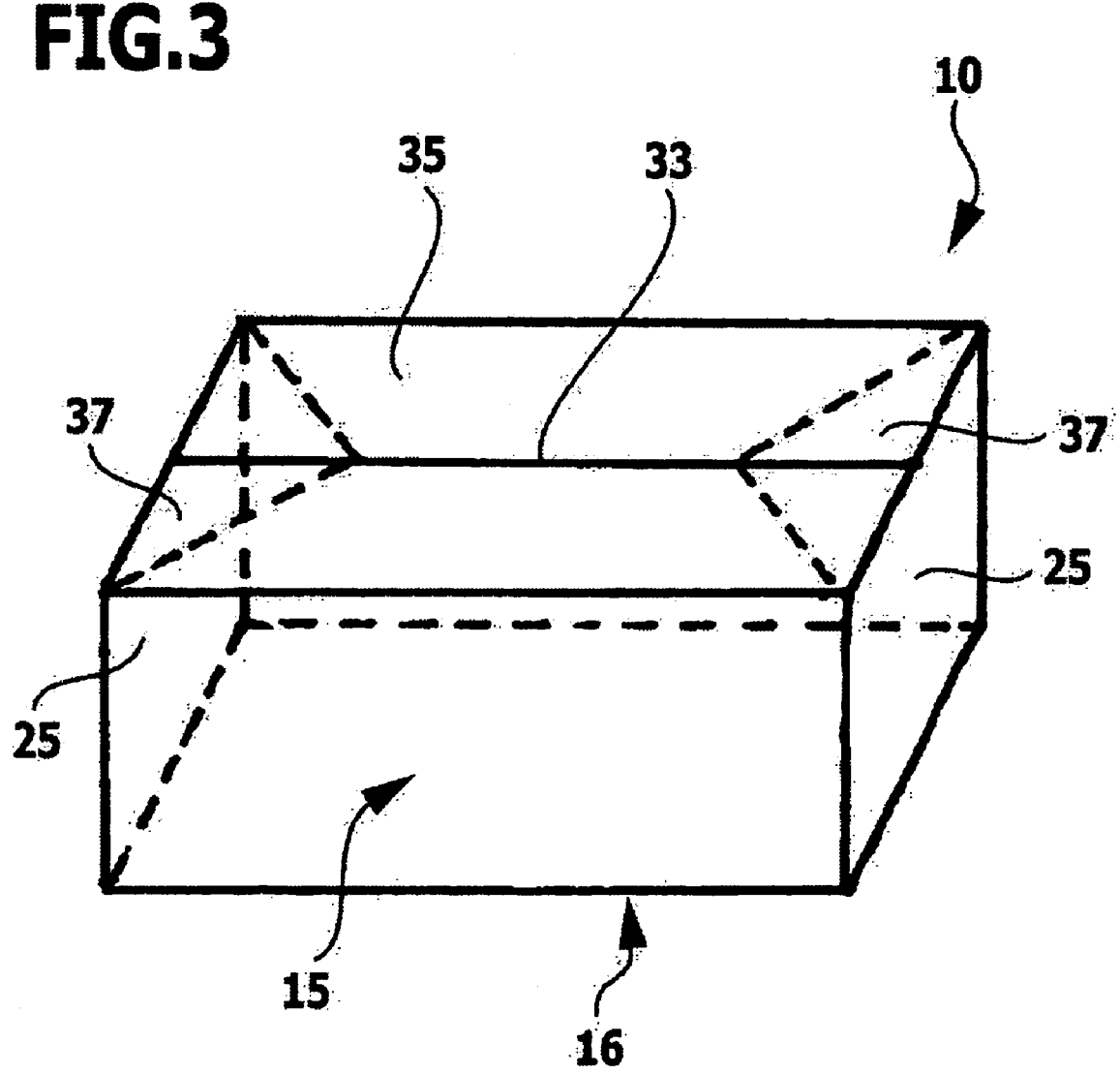
FIG. 3 is a further drawing of the hood according to FIG. 1.

The tube 23 of sheeting welded in this way can be brought into the substantially cuboidal structure of the hood 10, as is shown in FIG. 3. In this case, the previously folded regions 25 of the sheeting form two opposite sides 25 of the hood 10. The weld 33 formed by welding the end 29 of the tube 23 runs along a centre line of the side 35 of the hood 10 located opposite the opening 14, wherein the sections of the previously folded regions 25 adjacent to the weld 33 are folded in towards the internal space 15 of the hood 10, so that two triangular regions 37 are formed, in which the sheeting comes to lie in three layers one on top of the other.

A second exemplary embodiment of a hood according to the invention with a substantially cuboidal structure can also be produced by welding and folding two rectangular pieces of sheeting, as will be described below with reference to FIGS. 4 and 5.

Figure 5:
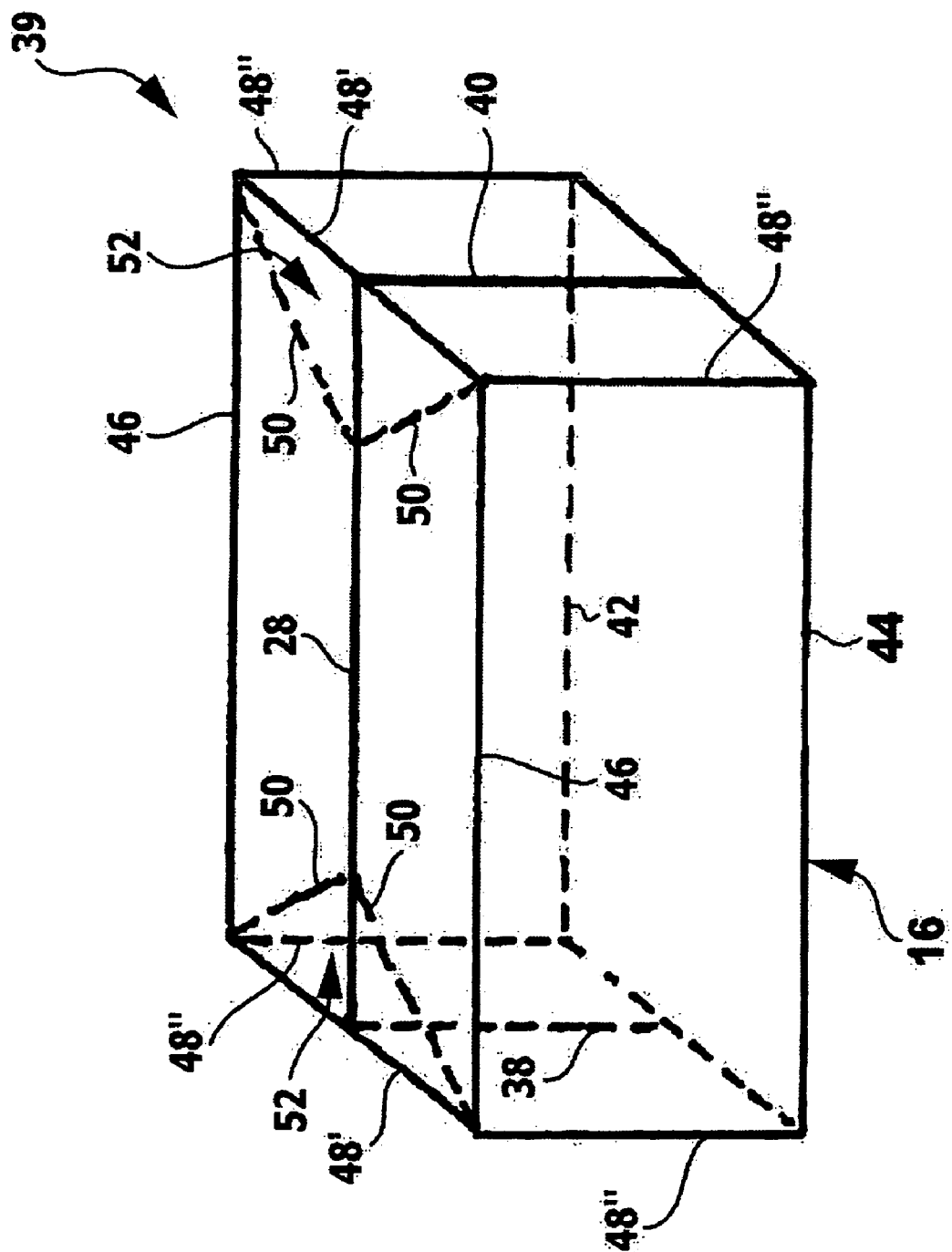
FIG. 5 is a perspective drawing of the second exemplary embodiment of a hood according to the invention.

FIG. 5 is a perspective drawing of the second exemplary embodiment of the hood, which is given the overall reference 39, including the welds and the folded-in regions of the sheeting.

Figure 4:
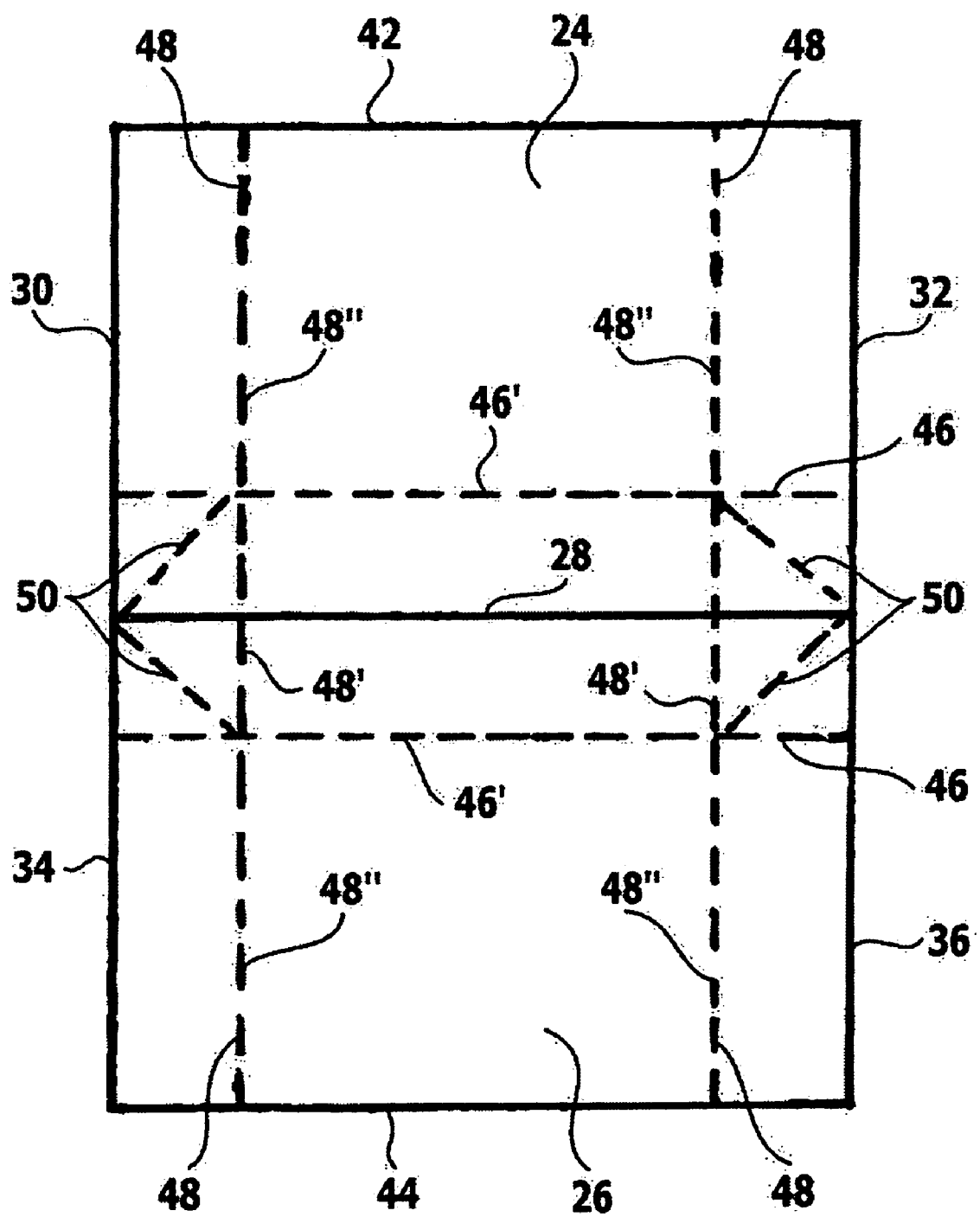
FIG. 4 is a schematic drawing relating to the production of a second exemplary embodiment of a hood according to the invention.

The pieces of sheeting 24 and 26 used to produce the hood 10 are shown in opened out form in FIG. 4. The two rectangular pieces of equal size are firstly welded together along a central weld 28 on one of their respective edges. In addition, to produce the hood 39 the edges 30 and 32 of the first piece 24 of sheeting adjacent to the central weld 28 are also welded to the corresponding edges 35 and 36 respectively of the second piece 26 of sheeting to form the lateral welds 38 and 40 respectively shown in FIG. 3. The edges 42 and 44 located opposite the central weld 28 thus form the opening 16 of the hood 39.

To produce the hood 39 the pieces of sheeting 24 and 26 are folded along the following folding lines (shown in dotted lines in FIG. 4), wherein the course of the folding lines relates to the sheets 24 and 26 when opened out in one plane: two central folding lines 46 respectively run at an identical distance from both sides parallel to the central weld 28, two lateral folding lines 48 respectively run at the same identical distance from both sides parallel to the lateral welds 38 and 40, and four diagonal folding lines 50 respectively run from the four intersection points of the central folding lines 46 with the lateral folding lines 48 as far as the respectively adjacent end of the central weld 28.

Along the diagonal folding lines 50 and also along those sections 48' of the lateral folding line 48, which lie between the intersection points with the central folding lines 46, the sheet is folded 180°, so that three respective triangular sheet regions 52 come to lie congruently one on top of the other.

Along the central folding lines 46 and also along those sections 48" of the lateral folding lines 48, which lie outside the intersection points with the central folding lines 46, the sheet is folded 90°, so that the hood 39 has the cuboidal structure shown in FIG. 5.

In this case, the sections 48" form the four edges of the hood 39 running perpendicularly to the opening 16, and sections 48' form two parallel edges of the hood 39 located opposite the opening 16. Two further parallel edges, which are located opposite the opening 16 and run perpendicularly to the sections 48', are formed by those sections 46' of the central folding lines 46, which lie between the intersection points with the lateral folding lines 48.

Alternatively to using two sheets 24 and 26, it is also possible to use a single sheet that is double the size. In this case, weld 28 is omitted.

Figure 6:
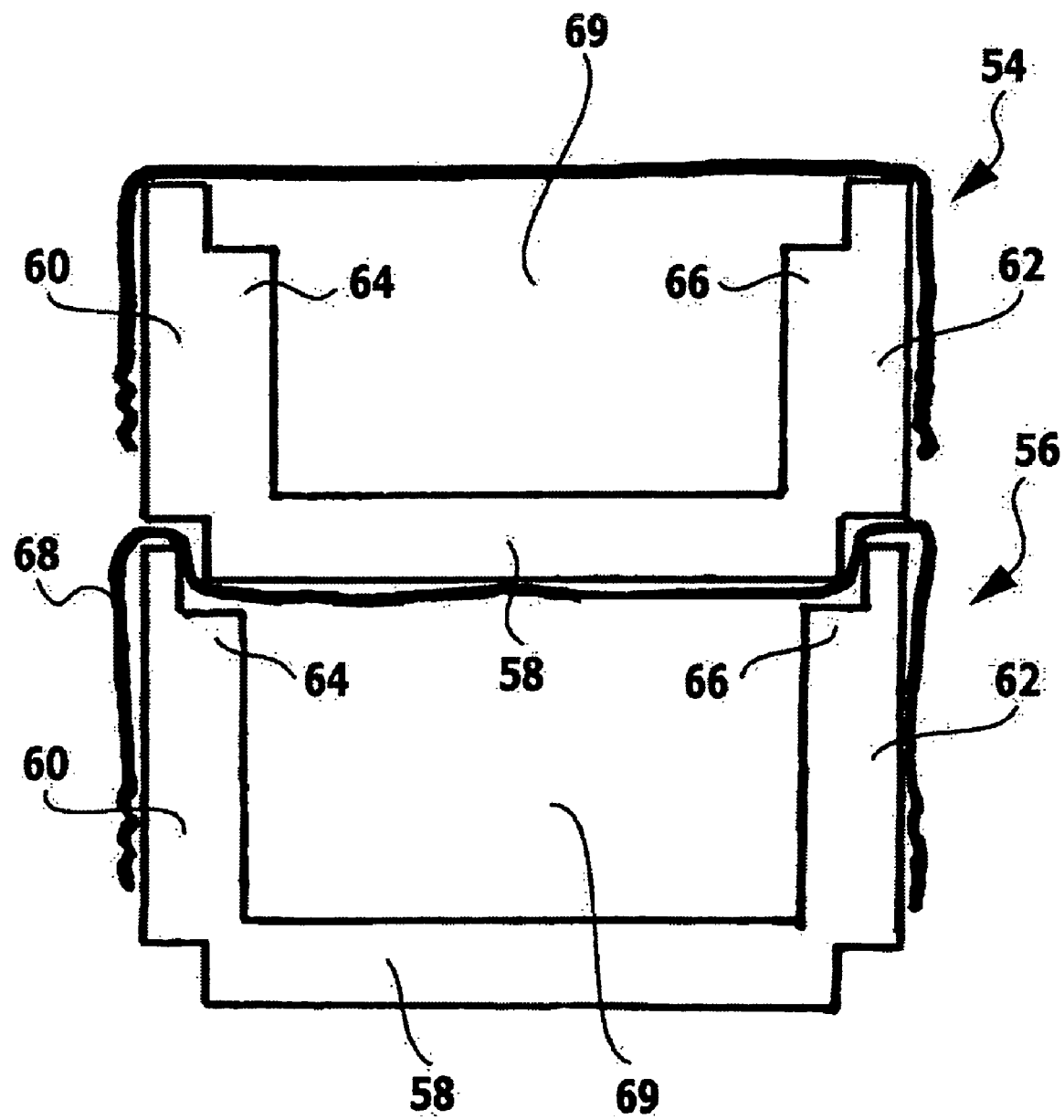
FIG. 6 is a sectional drawing of two containers stacked one on top of the other that are closed with hoods according to the invention.

Because of the high extensibility and tear resistance of the elastic sheet, it is possible to stack a plurality of closed containers on top of one another without there being any risk of damage to the hood. This is illustrated in FIG. 6.

Storage and transport containers are frequently stacked on top of one another, wherein they are configured so that lateral slippage of the containers is prevented. FIG. 6 schematically shows two containers 54 and 56 stacked on top of one another in lateral cross-section. Slippage of the first container 54 is prevented by a projection 58 on the underside of the container 54 engaging between the side walls 60 and 62 of the lower container 56 and thus lying on projections 64 and 66.

Alternatively to the embodiment of the containers 54 and 56 shown here, further configurations are possible to prevent a transverse displacement by means of a positive-locking arrangement between the containers.

Here, the lower container 56 is closed with a hood 68, which corresponds to the hood 10 of the first exemplary embodiment. In this case, the hood 68 is partially pressed in towards the receiving space 69 of the container 56 by the projection 58 of container 54, which is possible without any problem as a result of the elastic extensibility of the sheet used for the hood 68 without there being a risk of the sheet tearing. The same advantage is provided in other configurations of the form-locking arrangement between the containers, since this is always associated with extension of the sheet.

Figure 7:
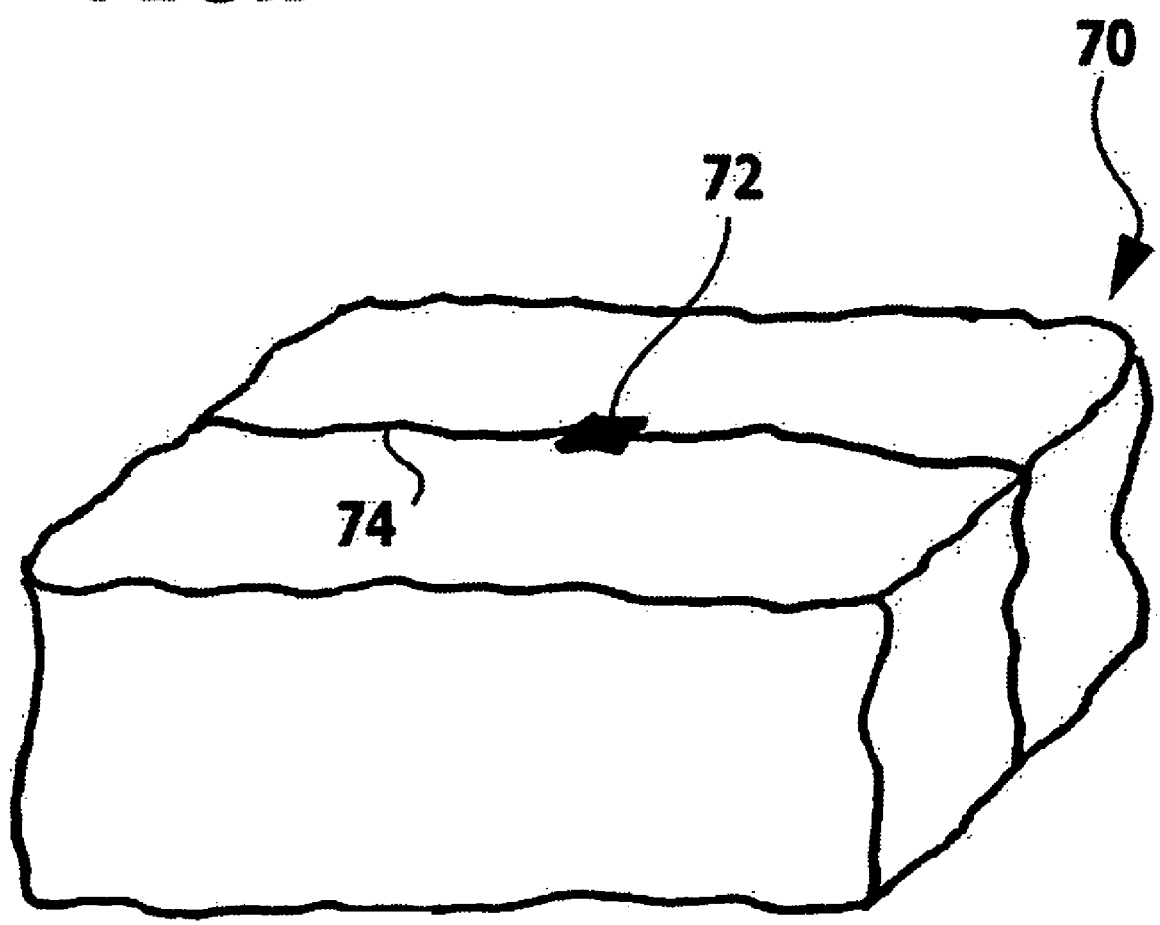
FIG. 7 is a perspective drawing of a third exemplary embodiment of a hood according to the invention.

A third exemplary embodiment of a hood according to the invention is shown in a perspective drawing in FIG. 7 and is given the reference 70 there. The hood 70 can be produced from a sheet, which contains at least one volatile corrosion inhibitor, as in the case of the hood 10 of the first exemplary embodiment. However, it can also be a sheet without any corrosion inhibitor.

The hood 70 comprises an electronic memory element 72, which is welded into a weld 74 of the hood 70. Various data can be stored in the memory element 72 that are relevant to a container closed by the hood 70, in particular the type and quantity of the contents of the container, the storage date etc.

The memory element 72 can comprise an RFID chip, for example, which can be read and recorded without contact by wireless transmission. In this way, different containers can be clearly identified at any time and the relevant data can be updated as required.

Alternatively to being welded into the sheet, the electronic memory element 72 can also be connected to the sheet in another way. For example, the memory chip can be adhered directly onto the sheet or be fastened by welding or gluing into or on a carrier. Such a carrier can in turn be adhered or welded onto the sheet, wherein the sheet and the carrier are preferably made of the same material, in particular polyethylene.

Figure 8:
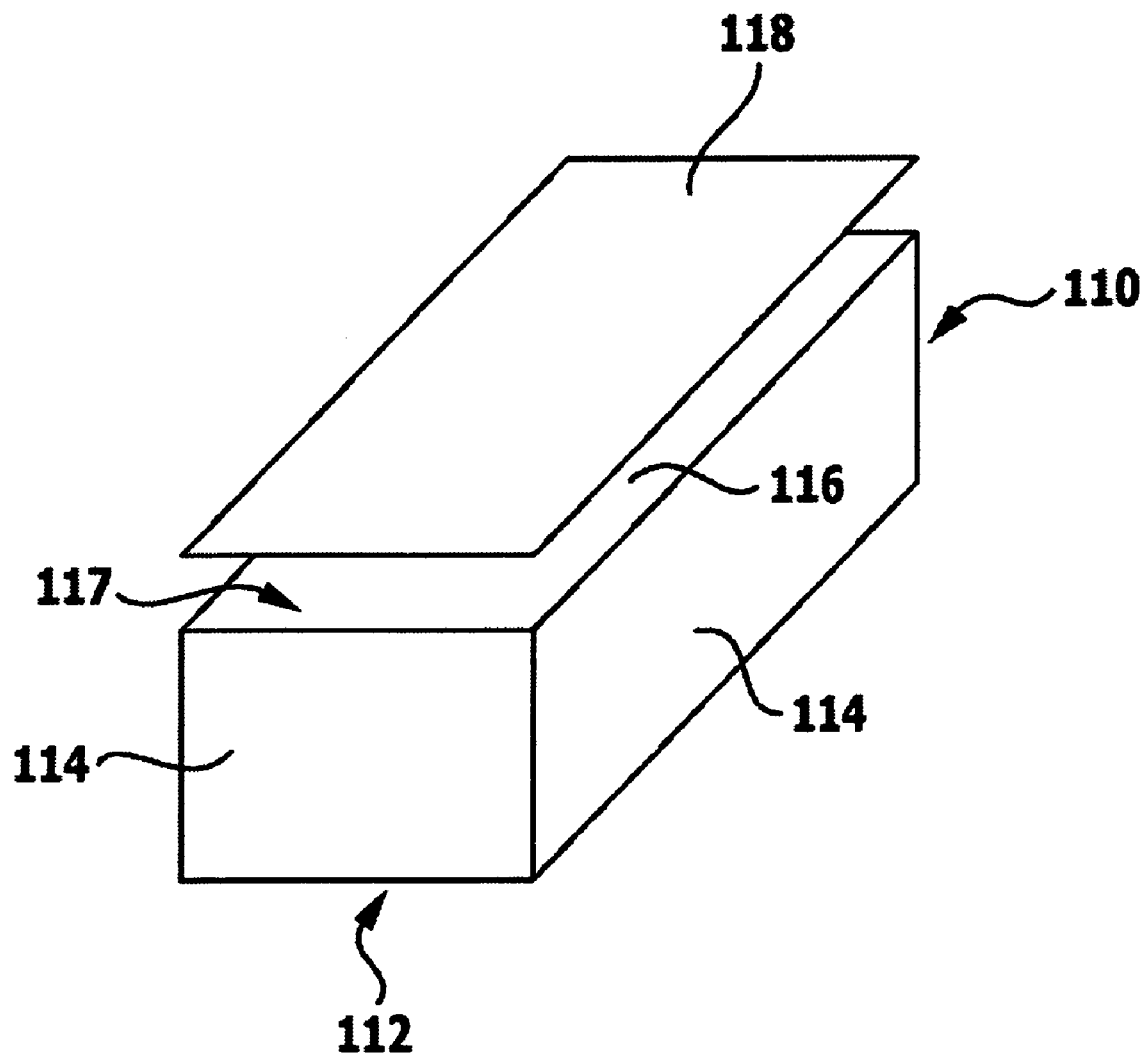
FIG. 8 is a perspective drawing of a container according to the invention with a cover.

FIG. 8 schematically shows a container, which can be used for storage and for transport of small load items and is given the overall reference 110. The container 110, which is preferably produced from plastic, has a cuboidal structure and comprises a rectangular base surface 112 and four rectangular side walls 114 respectively arranged parallel in pairs that extend perpendicularly upwards from the base surface 112. The container 10 defines a interior 116 and has an opening 117, which is formed by the upper edges of the side walls 114.

A cover 118 suitable for closing the opening 117 of the container 110 is shown in FIG. 8 in a position slightly raised above the container 110. The cover 118 is substantially rectangular and is preferably made of a plastic material, as is the container 110.

A holding device and/or a receiving space, which are arranged on the cover 118, are not visible in FIG. 8 because of the selected perspective. Possible configurations of the cover 118 according to the invention are evident from the four exemplary embodiments, which are shown in FIGS. 9 to 12 and are described below. In this case, the Figures respectively show a cover according to the invention and possibly a container in a sectional drawing, wherein the cutting plane corresponds to a plane of symmetry of the container 110.

Figure 9:
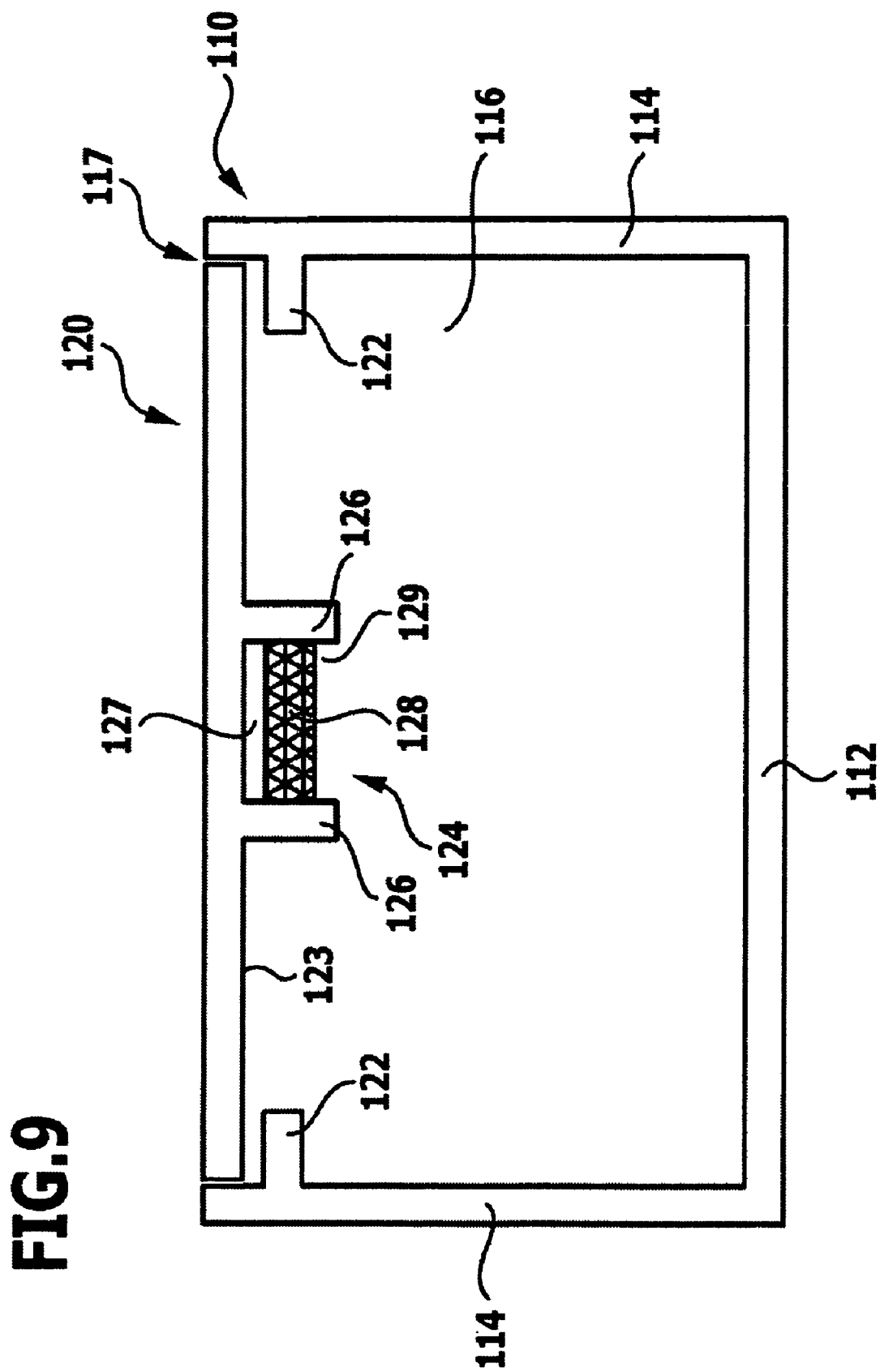
FIG. 9 is a sectional drawing of a container according to the invention with a first exemplary embodiment of a cover according to the invention.

A corresponding sectional drawing of the container 110, the opening 117 of which is closed with a first exemplary embodiment of a cover 120 according to the invention, is shown in FIG. 9. The cover 120 lies on bar-shaped projections 122, which are moulded on at least two opposing side walls 114 and run parallel to the edges of the side walls 114 forming the opening 117. In this case, the projections 122 are arranged at a spacing from the opening 117 approximately corresponding to the thickness of the cover 120, so that the cover terminates approximately flush with the side walls 114 and defines the interior 116 of the container 110 to the top.

A holding device 124 is arranged on the side facing the internal space 116 of the cover 120, i.e. the inside 123. This holding device 124 comprises two clamping elements 126 in the form of cuboidal or bar-shaped projections, which are spaced from one another and project at a right angle from the inside 123 of the cover 120. The clamping elements 126 define a receiving space 127 located between them, wherein a fluid connection 129 is defined between this receiving space 127 and the interior 116 of the container 110 by the side of the receiving space 127 remote from the inside 123 that is not closed.

A carrier element 128, which contains at least one volatile corrosion inhibitor, is arranged in the receiving space 127. In the shown exemplary embodiment, this carrier element 128 comprises a foam material that is dimensioned such that it is held in force-locking engagement, i.e. under stress, between the two clamping elements 126. The corrosion inhibitor contained in the foam material can diffuse out of this through the porous structure of the foam material, by way of the fluid connection 129, diffuse further into the interior 116 of the container 110 and be uniformly distributed there.

Alternatively, instead of a foam material another carrier element can also be used, e.g. a tablet, a pellet or similar, with corrosion inhibitor contained therein. In this case, the size of the tablet and the spacing between the clamping elements 126 are respectively selected so that the tablet is inserted into the receiving space 127 under tension and is held in force-locking engagement between the clamping elements 126. In this case, the corrosion inhibitor can also diffuse out of the carrier element 128, i.e. the tablet, located in the holding position and pass via the fluid connection 129 into the interior 116 of the container 110.

Figure 10:
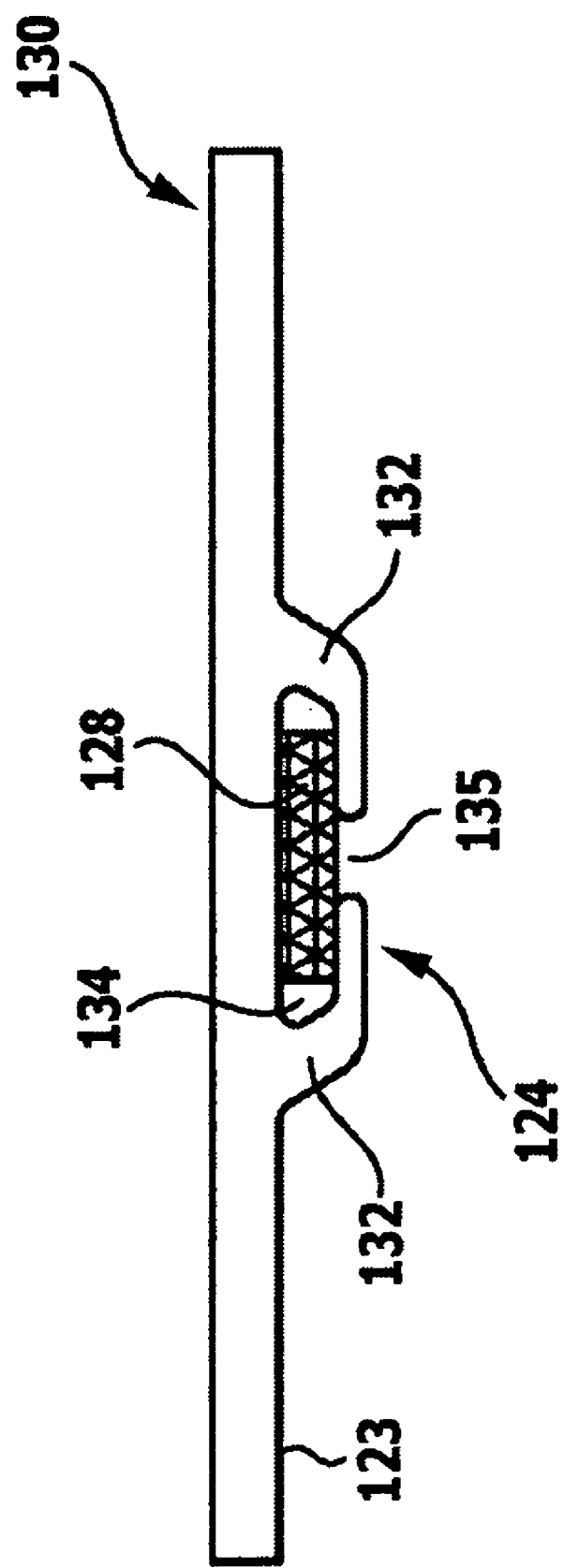
FIG. 10 is a sectional drawing of a second exemplary embodiment of a cover according to the invention.

In a second exemplary embodiment of a cover according to the invention, which is given the reference 130 in FIG. 10, the holding device 124 also comprises two clamping elements 132. The clamping elements 132 are spaced from one another on the inside 123 of the cover 130 and have an approximately L-shaped structure. First sub-regions of the clamping elements 132 extend approximately at right angles away from the inside 123 of the cover 130. Adjoining second sub-regions of the clamping elements 132 extend parallel to the cover, wherein free ends of the second sub-regions of the two clamping elements 132 are oriented towards one another.

The clamping elements 132 define a receiving space 134, which lies between them and the inside 123 of the cover 130 and has a fluid connection 135 in the form of an outlet gap to the interior of a container that is not shown in the Figure.

A carrier element 128, which is inserted between the two clamping elements 132, is thus held in the receiving space 134 between the cover 130 and the clamping elements 132. One or more corrosion inhibitors contained in the carrier element 128 can diffuse through the fluid connection 135 into the interior of the container.

The clamping elements 132 are preferably configured in one piece with the cover 130, like the clamping elements 126 of the first exemplary embodiment.

Figure 11:
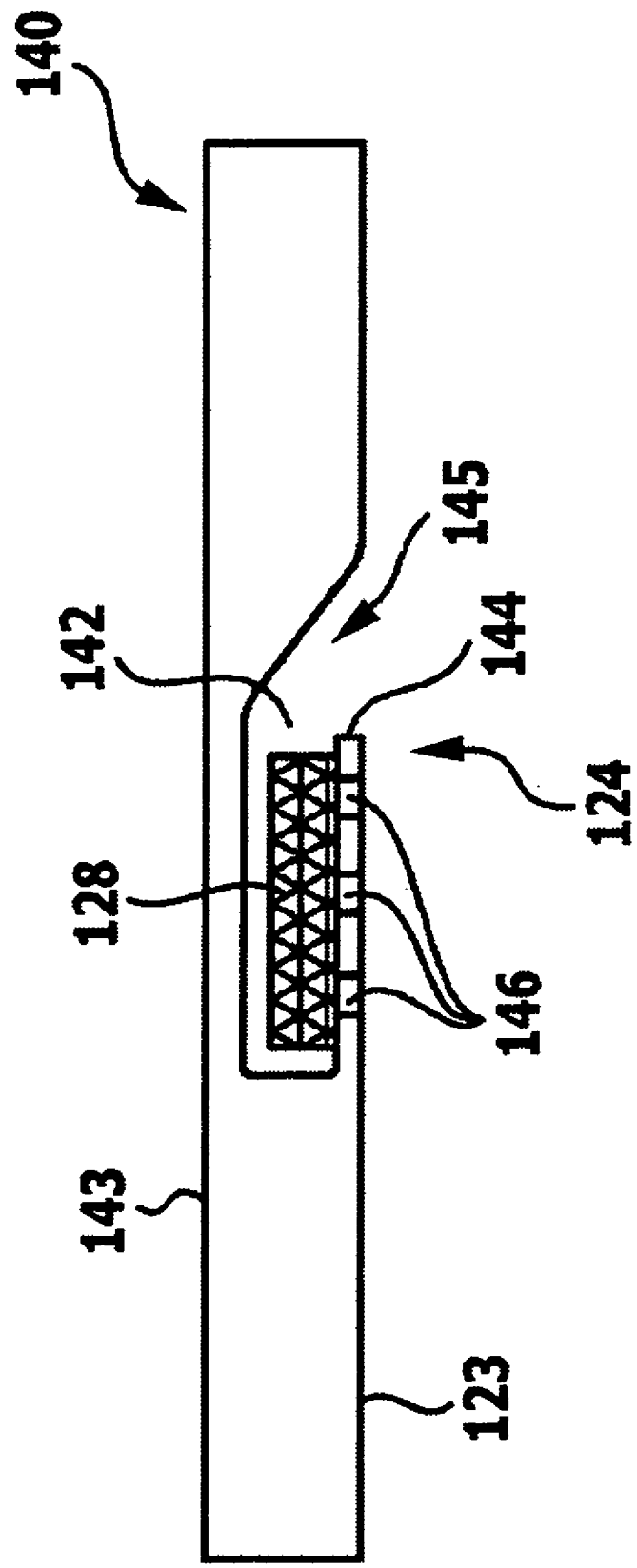
FIG. 11 is a sectional drawing of a third exemplary embodiment of a cover according to the invention.

A third exemplary embodiment of a cover according to the invention is shown in cross-section in FIG. 11 and is given the reference 140 there. The cover 140 is substantially solid in structure, but has an approximately cuboidal recess, which defines a receiving space 142 for a carrier element 128. While the receiving space 142 is closed towards the outside 143 of the cover, it is delimited towards the inside 123 by a support element 144, which is configured in one piece with the cover 140.

The support element 144 forms an approximately rectangular surface, runs parallel to the inside 123 of the cover 140 and terminates flush with this. Along at least one of its four edges, the support element 144 is not connected to the cover 140, but is spaced from this, so that a filling opening 145 of the receiving space 142 is formed. By means of the filling opening 145 the carrier element 128 can be inserted between the support element 144 and the cover 140, i.e. into the receiving space 142. In this case, the support element 144 serves as a holding device 124.

The support element 144 has perforations 146, so that the at least one volatile corrosion inhibitor can as far as possible diffuse unhindered out of the carrier element 128 into the interior 116 of the container 110. The perforations 146, besides the filling opening 145, form the fluid connection between the receiving space 142 and the interior 116 of the container 110. In this case, this can consist of few perforations 145, as shown in FIG. 11, or of a plurality of perforations. It is particularly advantageous if the support element 144 is configured in the form of a grating.

As part of this exemplary embodiment, the carrier element 128 can also be a foam material, a tablet or a pellet, for example. However, the carrier element 128 can also comprise a plastic sheath, for example, through which a corrosion inhibitor contained therein can diffuse.

As a result of the formation of the receiving space 142 in a recess of the cover 140, the cover 140 has a substantially planar structure overall, which benefits a good stacking ability of a plurality of covers 140 of the same kind. When a plurality of covers 140 with inserted carrier element 128 are stacked on top of one another, the latter is closed to be substantially gastight, since the perforations 146 and the filling opening 145 are closed by the outside 143 of the cover 140 lying underneath. As a result, the corrosion inhibitor is substantially prevented from diffusing out during storage of the cover 140.

Figure 12:
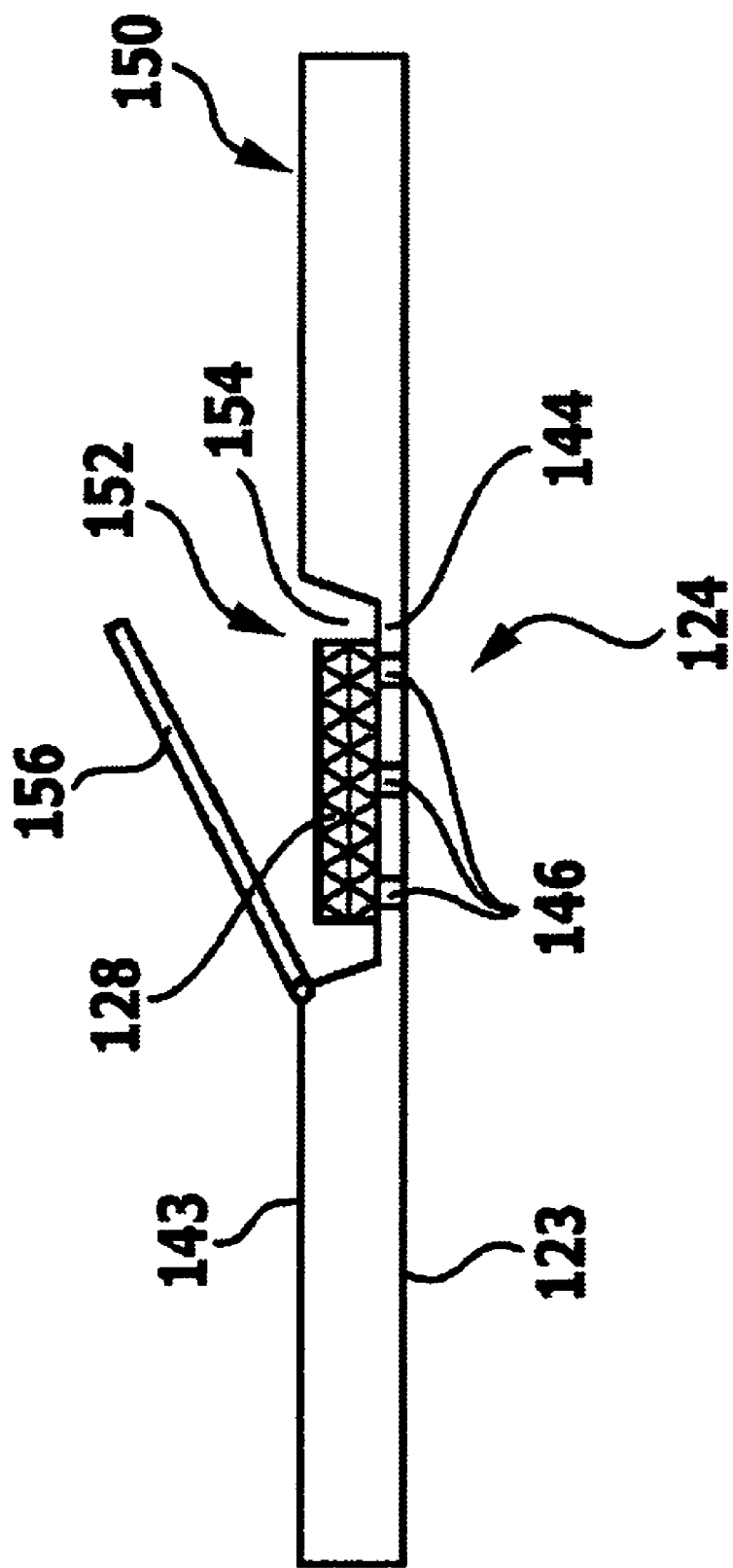
FIG. 12 is a sectional drawing of a fourth exemplary embodiment of a cover according to the invention.

A fourth exemplary embodiment of a cover according to the invention is shown in cross-section in FIG. 12 and is given the reference 150 there. In the case of cover 150 a receiving space 154 is also provided, which is formed by a substantially cuboidal recess in the otherwise solid cover 150.

A support element 144 that serves as a holding device 124 and is formed by a thinner wall section delimits the receiving space 154 towards the interior of the container. The substantially rectangular support element 144 is configured in one piece with the cover 150 and, in contrast to the third exemplary embodiment, is connected to the cover 150 along all four edges. A fluid connection between the receiving space 154 and the interior of the container is thus only formed by the perforations 146 provided in the support element 154. In this case, the support element 154 can also be configured in the form of a grating.

Towards the outside 143 of the cover 150 the receiving space 154 also has a filling opening 152, which is substantially rectangular and lies opposite the support element 144. A carrier element 128, which substantially fills the receiving space 154, can be comfortably inserted into this through the filling opening 152.

The filling opening 152 is closable by means of a closing element 156 in the form of a pivoting flap, which is hinged to the outside 143 of the cover 150. In the closed position of the flap the corrosion inhibitor is prevented from diffusing to the outside.

The cover 150 according to this exemplary embodiment provides the advantage that a carrier element 128 with depleted corrosion inhibitor can be replaced through the filling opening 152 without the container having to be opened.

In the above-described exemplary embodiments, the cover according to the invention is a rigid closing element, which is produced from a substantially inflexible plastic material. Irrespective of this, in the case of a hood according to the invention that is produced completely or partially from a flexible sheet, a receiving space and/or a holding device, as described above, can also be provided on the side of the hood facing the interior of the container.

Figure 13:
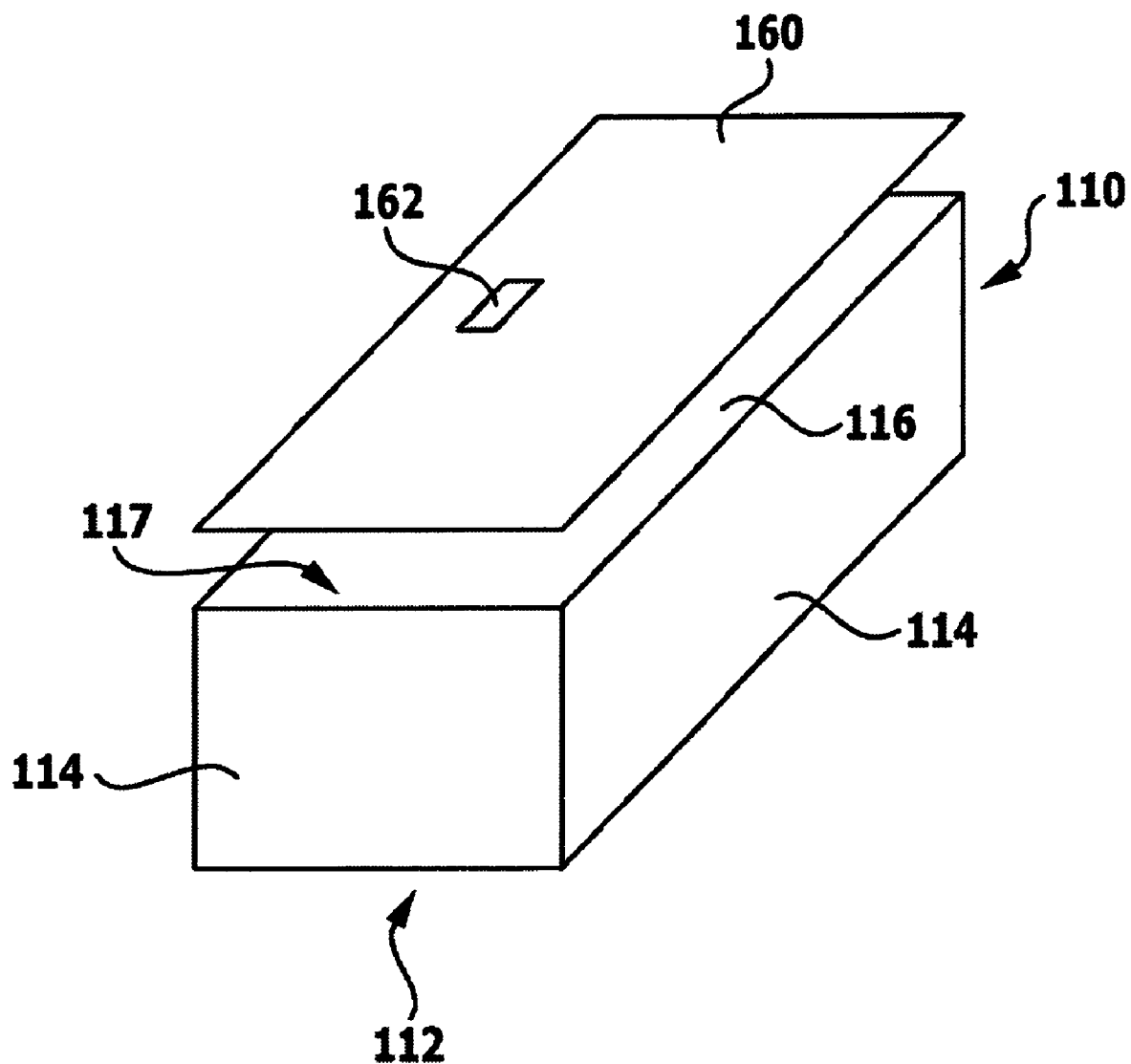
FIG. 13 is a perspective drawing of a container according to the invention with a fifth exemplary embodiment of a cover according to the invention.

FIG. 13 is a perspective drawing of the container 110 already shown in FIG. 8 with a fifth exemplary embodiment of a cover according to the invention, which is shown in a position slightly raised above the container 110 and is given the reference 160. The cover 160 can comprise a holding device and/or a receiving space as in the case of covers 120, 130, 140 or 150, if necessary.

The cover 160 according to the invention comprises an electronic memory element 162, which is adhered or welded on the outside of the cover 160. Various data that are relevant to the container 110, e.g. the type and quantity of the load items and/or the storage date, can be stored in the memory element 162. In particular, the deployment date of a corrosion inhibitor, which is located in a carrier element on the cover 160 or which is present in other form in the container 110, can also be stored in the memory element 162.

Figure 14:
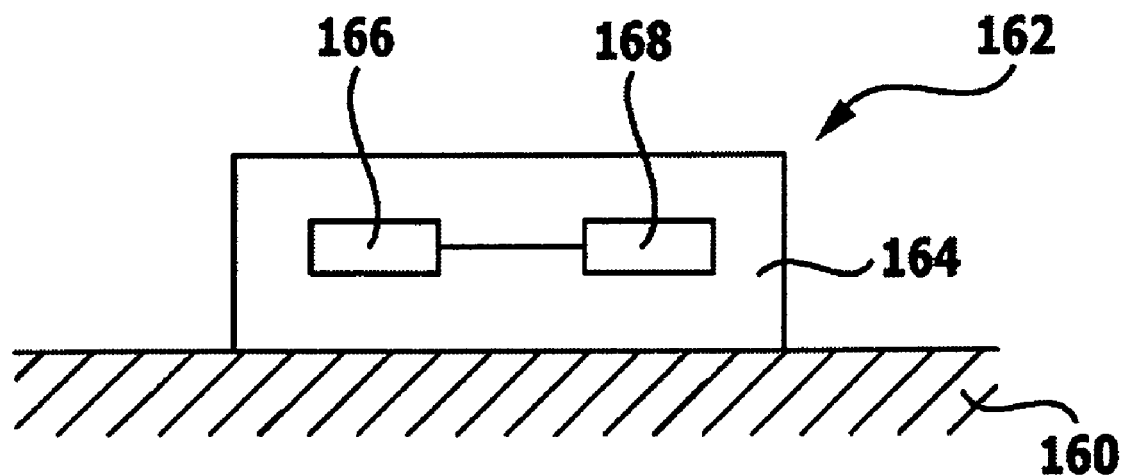
FIG. 14 is a schematic drawing of a part of the cover according to FIG. 13.

A detail view of the memory element 162 is shown schematically in FIG. 14. The memory element 162 comprises a carrier 164, into which an electronic memory chip 166 is welded. The carrier 164 is preferably made of plastic, in particular of the same plastic material as the cover 160, which provides the possibility of welding it onto the cover 160. An adhesive connection between the memory chip 166 and the carrier 164 and also between the carrier 164 and the cover 160 is equally possible.

The memory element 162 can additionally comprise an RFID chip 168, which allows a contactless readout of the stored data by wireless transmission. The memory chip 166 and the RFID chip 168 can also be configured as one unit. By using RFID chips different containers can be identified particularly quickly and simply and the relevant data can be updated as required.

In a corresponding manner, as described above for the cover 160, the electronic memory element can also be provided on the container 110, e.g. on one of the side walls 114 or on the base surface 112.

The invention claimed is:

1. A hood for closing a storage or transport container for a corrosion-sensitive load, the hood comprising:
    a top and sides which define an internal space and an opening; and
    an electronic memory element;
    wherein:
        the hood is produced from a sheet which contains at least one volatile corrosion inhibitor, and
        at least one of a working life and a deployment date of the at least one volatile corrosion inhibitor is stored in the memory element.

2. A hood according to claim 1, wherein the memory element is readable without contact.

3. A hood according to claim 1, wherein the memory element is recordable without contact.

4. A hood according to claim 1, wherein the memory element is non-detachably connected to the hood.

5. A hood according to claim 1, wherein the memory element is welded onto the hood.

6. A hood according to claim 1, wherein the memory element is adhered to the hood.

7. Hood according to claim 1, wherein the memory element is welded in a weld of the hood.

8. A hood according to claim 1, wherein the memory element comprises an electronic memory chip and a carrier.

9. A hood according to claim 8, wherein the memory chip is adhered to the carrier or is embedded in the carrier.

10. A hood according to claim 8, wherein the carrier is produced from polyethylene.

11. Storage or transport container for receiving a corrosion-sensitive load, comprising:
    a hood;
    an electronic memory element disposed on the hood; and
    wherein:
        the hood comprises a top and sides which define an internal space and an opening;
        the hood is produced from a sheet which contains at least one volatile corrosion inhibitor, and
        at least one of a working life and a deployment date of the at least one volatile corrosion inhibitor is stored in the memory element.

12. Hood according to claim 1, wherein the sheet is elastically extensible.

13. Hood according to claim 12, wherein the sheet has an extension at tear of 300% or more.

14. Hood according to claim 13, wherein the sheet has an extension at tear of 600% or more.

15. Hood according to claim 12, wherein the sheet has an elastic extension of 50% or more.

16. Hood according to claim 15, wherein the sheet has an elastic extension of 100% or more.

17. Hood according to claim 1, wherein the sheet has a thickness of 40 to 150 μm.

18. Hood according to claim 17, wherein the sheet has a thickness of 50 to 80 μm.

19. Hood according to claim 1, wherein the sheet is produced from polyethylene or polyethylene copolymers.

20. Hood according to claim 19, wherein the sheet is produced from linear low-density polyethylene (LLDPE) or very low density polyethylene (VLDPE) or corresponding copolymers.

21. Hood according to claim 19, wherein the sheet is produced from metallocene polyethylene (mPE) or corresponding copolymers.

22. Hood according to claim 1, wherein the sheet comprises two or more layers.

23. Hood according to claim 22, wherein the sheet comprises three layers, wherein the at least one volatile corrosion inhibitor is contained in one of two outer layers of the sheet.

24. Hood according to claim 1, wherein:
    the hood is produced from a two-layered or a multilayered sheet,
    the at least one volatile corrosion inhibitor is contained at least in a layer of the sheet facing the internal space.

25. Hood according to claim 22, wherein the layers of the sheet are coextruded.

26. Hood according to claim 1, wherein the at least one volatile corrosion inhibitor is contained in the sheet in a form of fine powder.

27. Hood according to claim 1, wherein the at least one volatile corrosion inhibitor is selected from nitrates, nitrites, phosphates, silicates, borates, chromates, molybdates, amines, benzoates, heterocyclic compounds and mixtures thereof.

28. Hood according to claim 1, wherein the sheet is translucently colored.

29. Hood according to claim 1, wherein:
(i) the hood further comprises a receiving space for the at least one volatile corrosion inhibitor, and a fluid connection is provided between the receiving space and the inside of the hood; and/or
(ii) on its inside the hood further comprises a holding device for a carrier element, which contains the at least one volatile corrosion inhibitor.

30. Hood according to claim 29, wherein the receiving space is configured to receive the carrier element containing the at least one volatile corrosion inhibitor.

31. Hood according to claim 29 wherein the receiving space is defined at least partially by a recess arranged on the cover.

32. Hood according to claim 29, wherein the fluid connection between the receiving space and the inside of the hood is formed by one or more perforations in a boundary of the receiving space.

33. Hood according to claim 32, wherein the boundary of the receiving space has a multiplicity of perforations.

34. Hood according to claim 33, wherein the perforations are arranged at regular intervals.

35. Hood according to claim 29, wherein the receiving space has a filling opening, which can be closed with a closure element.

36. Hood according to claim 35, wherein the receiving space can be filled through the filling opening from the outside of the hood.

37. Hood according to claim 29, wherein the receiving space is defined at least partially by the holding device.

38. Hood according to claim 29, wherein the holding device comprises a support element, which is configured and arranged on the hood in such a manner that the carrier element can be inserted between the hood and the support element.

39. Hood according to claim 38, wherein the support element forms a part of the boundary of the receiving space.

40. Hood according to claim 29, wherein the holding device is configured for holding the carrier element in a shape- and/or force-locking manner.

41. Hood according to claim 40, wherein the holding device comprises one or more clamping elements.

42. Hood according to claim 29, wherein the holding device comprises one or more spikes, barbs or the like.

43. Hood according to claim 29, wherein the holding device is moulded on the hood in one piece.

44. Hood according to claim 29, wherein the holding device comprises a first holding element, which can be connected to a second holding element on the carrier element corresponding to the first holding element.

45. Hood according to claim 44, wherein the holding device comprises a part of a touch and close fastener as the first holding element.

46. Hood according to claim 29, wherein the holding device comprises an adhesive medium.

47. Hood according to claim 29, wherein the hood is configured such that it is stackable with further hoods of the same kind.

48. Hood according to claim 29, wherein the hood comprises the carrier element, which contains the at least one volatile corrosion inhibitor.

49. Hood according to claim 48, wherein the carrier element comprises a porous material.

50. Hood according to claim 48, wherein the carrier element comprises a foam material.

51. Hood according to claim 48, wherein the carrier element comprises a tablet, a pellet or the like.

52. Hood according to claim 48, wherein the carrier element comprises a permeable sheath for the at least one volatile corrosion inhibitor.

53. Storage or transport container according to claim 11, wherein:
(i) the hood further comprises a receiving space for the at least one volatile corrosion inhibitor, and a fluid connection is provided between the receiving space and the inside of the hood; and/or
(ii) on its inside the hood further comprises a holding device for a carrier element, which contains the at least one volatile corrosion inhibitor.

54. Container according to claim 53, wherein the container can be closed by the hood to be airtight and water vapour-tight.

55. Container according to claim 53, wherein at least one of the container and the hood comprises a sealing element.

* * * * *